(12) United States Patent
Sotgiu et al.

(10) Patent No.: US 8,632,291 B2
(45) Date of Patent: Jan. 21, 2014

(54) APPARATUS FOR POSITIONING TYRED WHEELS ON A TYRE CHANGER MACHINE

(75) Inventors: Paolo Sotgiu, Modena (IT); Silvio Manicardi, Carpi (IT)

(73) Assignee: Snap-On Equipment SRL a Unico Socio, Correggio (RE) (IT)

( * ) Notice: Subject to any disclaimer, the term of this patent is extended or adjusted under 35 U.S.C. 154(b) by 1014 days.

(21) Appl. No.: 12/081,700

(22) Filed: Apr. 18, 2008

(65) Prior Publication Data

US 2009/0047107 A1    Feb. 19, 2009

(30) Foreign Application Priority Data

Apr. 18, 2007  (EP) ..................................... 07007864

(51) Int. Cl.
*B60B 29/00* (2006.01)
(52) U.S. Cl.
USPC ........................................... 414/426; 414/463
(58) Field of Classification Search
USPC ................................................. 414/426, 463
See application file for complete search history.

(56) References Cited

U.S. PATENT DOCUMENTS

| | | | |
|---|---|---|---|
| 2,665,108 A | | 1/1964 | Branick |
| 4,773,810 A | * | 9/1988 | Nishimura et al. ...... 414/331.11 |
| 5,257,443 A | * | 11/1993 | Tanimura et al. ............. 29/33 R |

FOREIGN PATENT DOCUMENTS

| | | |
|---|---|---|
| EP | 0 960 751 A1 | 12/1999 |
| EP | 1 253 026 A2 | 10/2002 |

* cited by examiner

*Primary Examiner* — Saul Rodriguez
*Assistant Examiner* — Willie Berry, Jr.
(74) *Attorney, Agent, or Firm* — McDermott Will & Emery LLP

(57) ABSTRACT

An apparatus is provided for positioning a tired wheel 14 onto an upright rotary wheel holder unit 1 of a tire changer machine. A first frame 3 is driven by a first actuator 8 to move the wheel 14 between a lower position and an upper position from which the wheel 14 is brought onto the rotary wheel holder unit 1. A second frame 2 is connected with a second actuator 9 to be driven between a lower position to an end position above the upper position to remove the wheel 14 from the first frame 3, and to support the wheel 14 with the wheel axis 15 in alignment with a rotation axis 16 of the rotary wheel holder unit 1. The second frame 2 is lowered by the action of the second actuator 9 for positioning the tired wheel 14 onto the rotary wheel holder unit 1.

21 Claims, 8 Drawing Sheets

APPARATUS FOR POSITIONING TYRED WHEELS ON A TYRE CHANGER MACHINE

The invention concerns an apparatus for positioning a tyred wheel onto an upright wheel holder unit of a tyre changer machine according to the preamble of claim 1.

Such an apparatus is disclosed in EP 1 253 026 A2. The known apparatus comprises one single frame which is driven by associated actuator means and adapted to move the wheel between a lower position in which the wheel can be loaded and unloaded close to the floor surface and an upper position above the wheel holder unit. The wheel axis brought into alignment with the rotation axis of the wheel holder unit and then the one frame is lowered to position the wheel onto the wheel holder unit.

The known positioning apparatus is designed to more or less markedly reduce the muscular strength required, by lifting the tyred wheel to the operating height and lowering it to the floor.

Since the movement of the one frame between the lower position and the upper position is performed by rotational motions of the actuating means it is difficult to align the wheel axis with the rotary holder unit during the lowering motion for positioning the wheel onto the holder unit.

The problem to be solved by the invention is to provide an apparatus of the initially described type in which the positioning of the tyred wheel onto the rotary wheel holder of a tyre changer machine is facilitated.

The problem is solved by the features of claim 1. The subclaims disclose modifications of the invention.

The invention provides two frames which are actuated by two associated actuator means. The movements of the one frame and of the thereto associated actuator means do not influence the movements of the other frame and of the thereto associated actuator means. The two systems operate kinematically independent from each other.

The apparatus is designed for loading, unloading and positioning tyred wheels relative to a rotary wheel holder unit of a tyre changer machine. One of the two frames is configured as a supporting frame extending at least partly around a rotary wheel holder unit and having at the top a delimiting surface on which a tyred wheel can rest and slide. The associated actuator means acts for lifting and lowering the supporting frame between a lower home position and an upper operating position above the wheel holder unit. The other frame, which can be a front frame arranged on the front side of the machine is independent from the supporting frame and includes two frame shoulders perpendicular to one another. The rotating and translating motions are kinematically free from the supporting frame. Independent actuator means of said frames move them from lowered home positions to lifted positions in which the front frame is lower than the supporting frame at its upper end of stroke. The actuator means comprise the actuators which cause co-ordinated lifting and lowering of the supporting frame and the front frame, partly using means for guiding the motion according to a time law suitably managed by automatic means or sensing means for checking the position of the front frame and/or of the supporting frame. The front frame can be driven by the associated actuator via a four-bar linkage arrangement. The automatic checking or sensing means allow the tyred wheel to be positioned with its axis substantially aligned with the rotation axis of the rotary wheel holder unit with changes in the external diameter of the wheel. Thus wheels with different diameters can be exactly positioned with respect to the rotation axis of the wheel holder unit. Automatic means for checking or measuring the external diameter of the wheel and automatic means for checking the position of the front frame on which the tyred wheel rests can be utilized for the alignment of the wheel axis with the rotation axis of the wheel holder unit. The wheel holder itself, particularly the shaft on which the wheel is supported, can be moved along the longitudinal axis of the machine, particularly the horizontal direction in order to facilitate the alignment of the wheel axis with the rotation axis of the wheel holder unit. The frames can support sliding means for transferring the wheel or the rim between the two frames, wherein said sliding means can comprise rollers. The present invention provides an apparatus for loading and unloading a tyred wheel in a tyre changer machine, wherein in a first step the tyred wheel is automatically positioned on a supporting frame and then the wheel is positioned on the rotary wheel holder unit with the wheel substantially centered on the latter.

The advantage is to eliminate not just the physical effort required, but also the time usually needed to manually center the wheel on the rotary wheel holder unit.

The accompanying drawings show a preferred embodiment of the invention.

Figure 1:
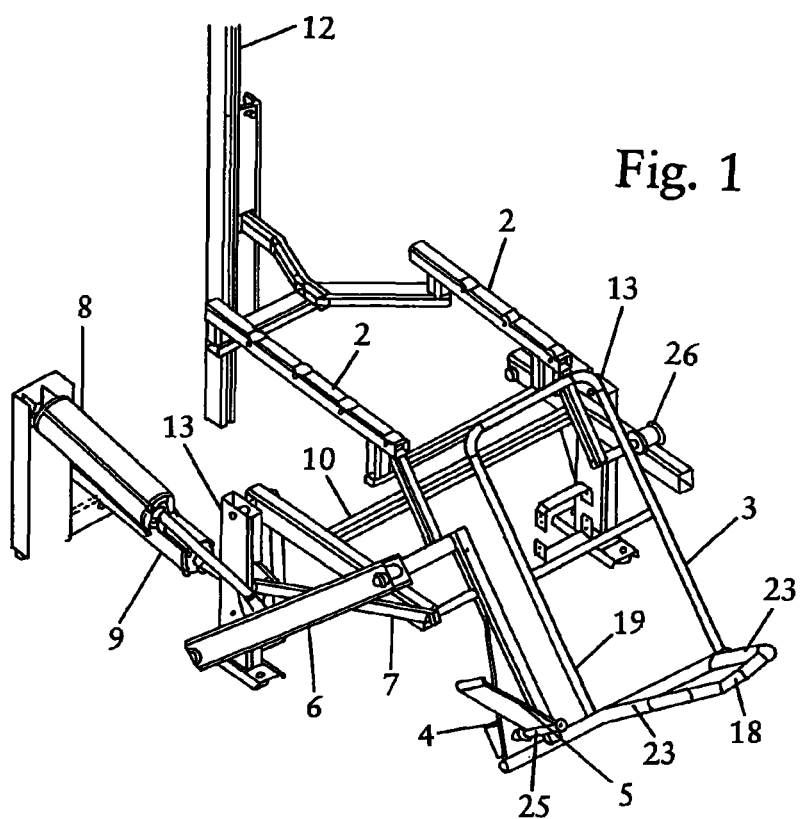
FIG. 1 is a perspective view of the embodiment.
Figure 2:
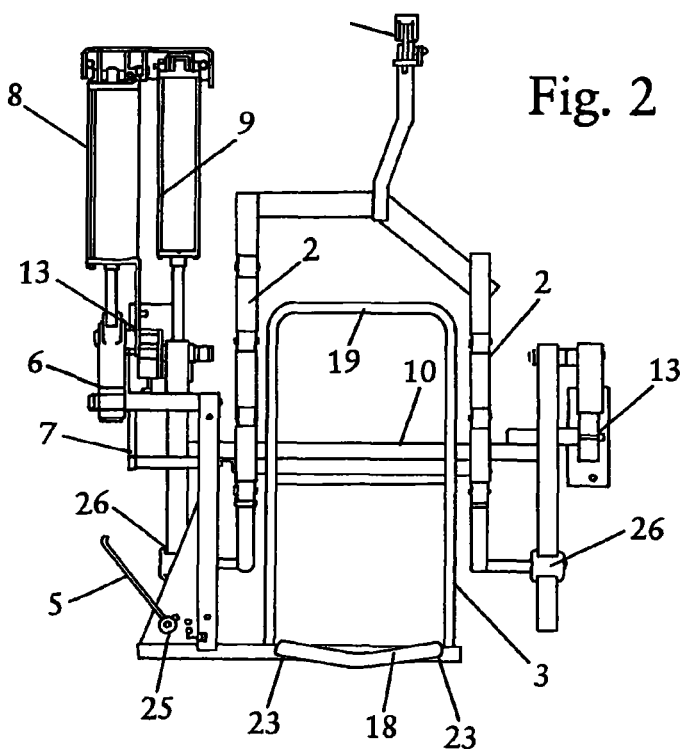
FIG. 2 is a plan view of the embodiment.

The embodiment of an automatic loading and unloading apparatus for tyred wheels 14 for a tyre changer machine comprises a supporting frame 2, positioned around a rotary wheel holder unit 1 (shown in FIGS. 3-9) and delimiting it. Actuator means 9 and 10 are provided for lifting and lowering the frame 2 from a lower home position to an upper operating position (end position) above the wheel holder unit 1 and in which the frame 2 supports the tyred wheel 14. A front frame 3, kinematically independent of the supporting frame 2 is designed to receive the tyred wheel 14, support it during a combined rotatory and translatory movement and position it on the supporting frame 2. Actuator means 6, 7 and 8 for the frame 3 are designed to make it rotate and translate from a home (lower) position to one or more lifted positions, in which the frame 3 is substantially parallel with the supporting frame 2 which receives then the tyred wheel 14.

Detecting means detects the dimensions of the tyred wheel 14 and check or sensing means detect the position of the actuator means 8,9 for positioning the tyred wheel 14 on the rotary wheel holder unit 1 at the end of the loading and unloading device operating cycle. Sensing means 22 for detecting the positions of the front frame 3 can be provided in the pivot point 28 of a connecting rod 6 which is connected with the frame 3 and pivoted on a stationary support 13. Sensing means 29 for detecting the positions of the frame 2 can be provided at a pivot point 27 for a lifting unit which is connected with the frame 2 and pivoted on the support 13.

The device's operating cycle shown in FIGS. 3 to 9 will be explained as follows:

The tyred wheel 14 is positioned (FIG. 3) on the front frame 3 which is designated as a rotating—translating frame and a measuring device is used to record the external diameter of the tyred wheel 14. The measuring device may include a sensing element 5, particularly in form of a rotary plate connected to a detector 4 which may be designed as an angular position measuring device and is fitted on the frame 3. The connection between the sensing element 5 and the detector 4 may be a direct connection or realized by means of a mechanical drive. Since the wheel 14 rests on two fixing points 23 of a frame shoulder 18 at the base of the frame 3 the sensing element 5 supplies the third point of contact with the wheel 14 to unambiguously identify the external diameter of the wheel 14, because the wheel is fixed against movement on the two fixing points 23. The fixing points 23 are linear frame elements which are positioned parallel to each other and to an axis 25 around which the sensing element 5 is pivoted to the frame 3.

Instead of the plate, it is possible to use a "compression" system (not illustrated) which detects the third point not by drawing near a platform, but for example uses the lowering of an actuator caused by the weight of the tyre, if necessary using a sprung return. The extent of the lowering is managed by a device for detecting the pressing and measuring the wheel diameter.

Figure 4:
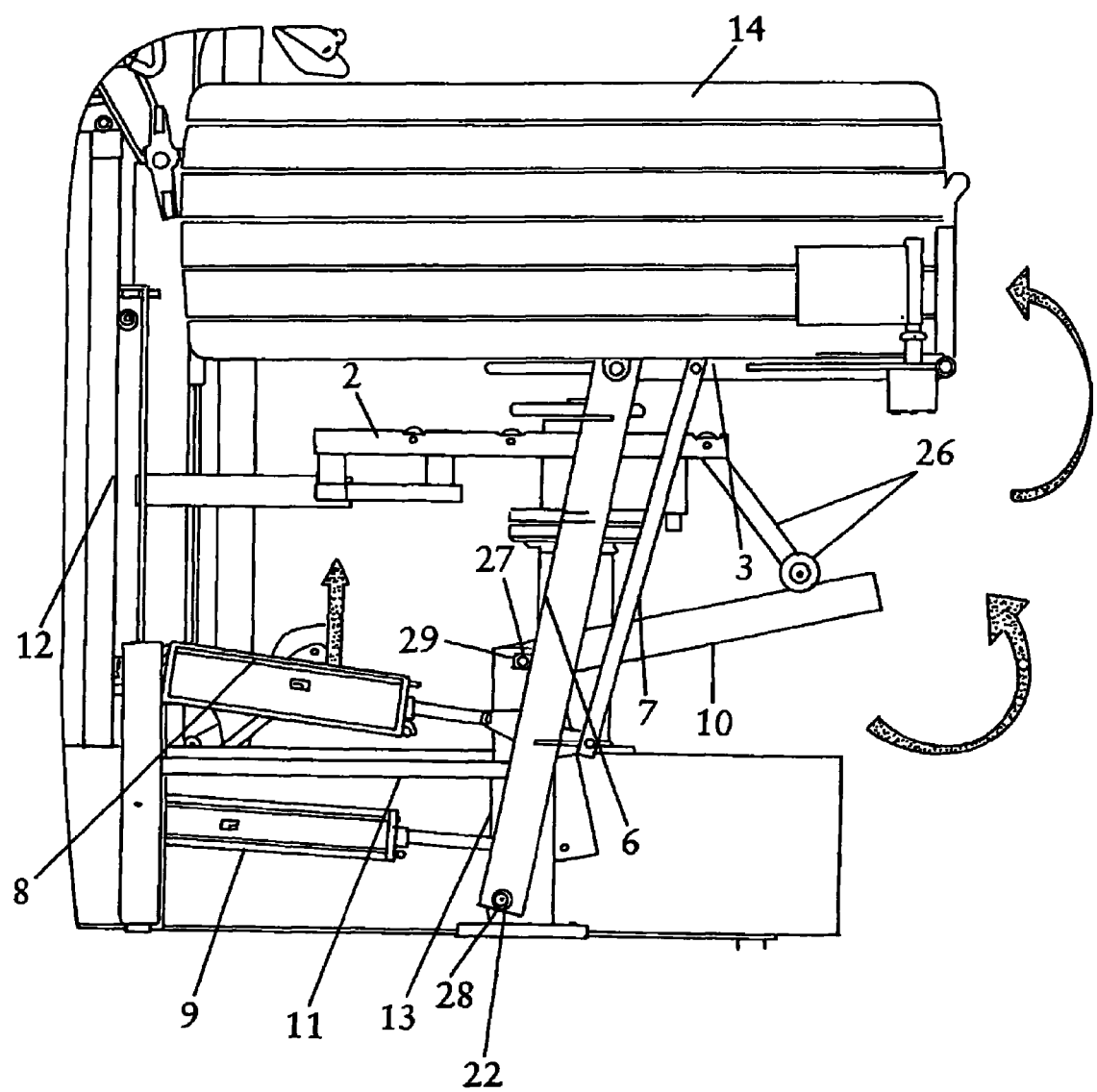
FIG. 4 is a side view of the embodiment, wherein the front frame is in its upper position.

The corresponding value of the measured diameter of the wheel 14 is managed in such a way as to control an actuator 8 which moves a four-bar linkage consisting of the connecting rods 6-7 and the frame 3, lifting it together with the wheel 14 to the desired operating position, thanks to sensing means 22 for detecting the position of the four-bar linkage. In the specific, non-limiting case provided by way of example with reference to the accompanying drawings, said sensing means 22 probably measure the angular position of the connecting rod 6, and/or of the connecting rod 7. When the angular value corresponding to the wheel diameter measurement made at point has been reached, the mechanism stops and the frame 3 is placed in its upper position (FIG. 4).

According to any consequentiality time law, using the sensing means 22 for detecting the position of the connecting rod 6 and/or of the connecting rod 7, a actuator 9 is operated, which rotatably drives a lifting unit 10 hinged by means of a pivoting 27 on a fixed support 13 and on which the frame 2 slides by means of a roller guide 26. The result is that an anti-clockwise rotation of the lifting unit 10 driven by the actuator 9 (FIG. 5) corresponds with the lifting of frame 2. Vice versa, a clockwise rotation of the lifting unit 10 driven by the actuator 9 corresponds with the lowering of frame 2. A vertical guidance device 12 allows the above-mentioned movement to be coordinated, optimising sliding and forms an integral part of the device. If necessary, lifting/lowering of frame 2 could be performed more simply by the actuator 9 directly hinged on the frame 2, the latter controlled by the guidance device 12, eliminating the above-mentioned lever drive of the lifting unit 10.

Figure 5:
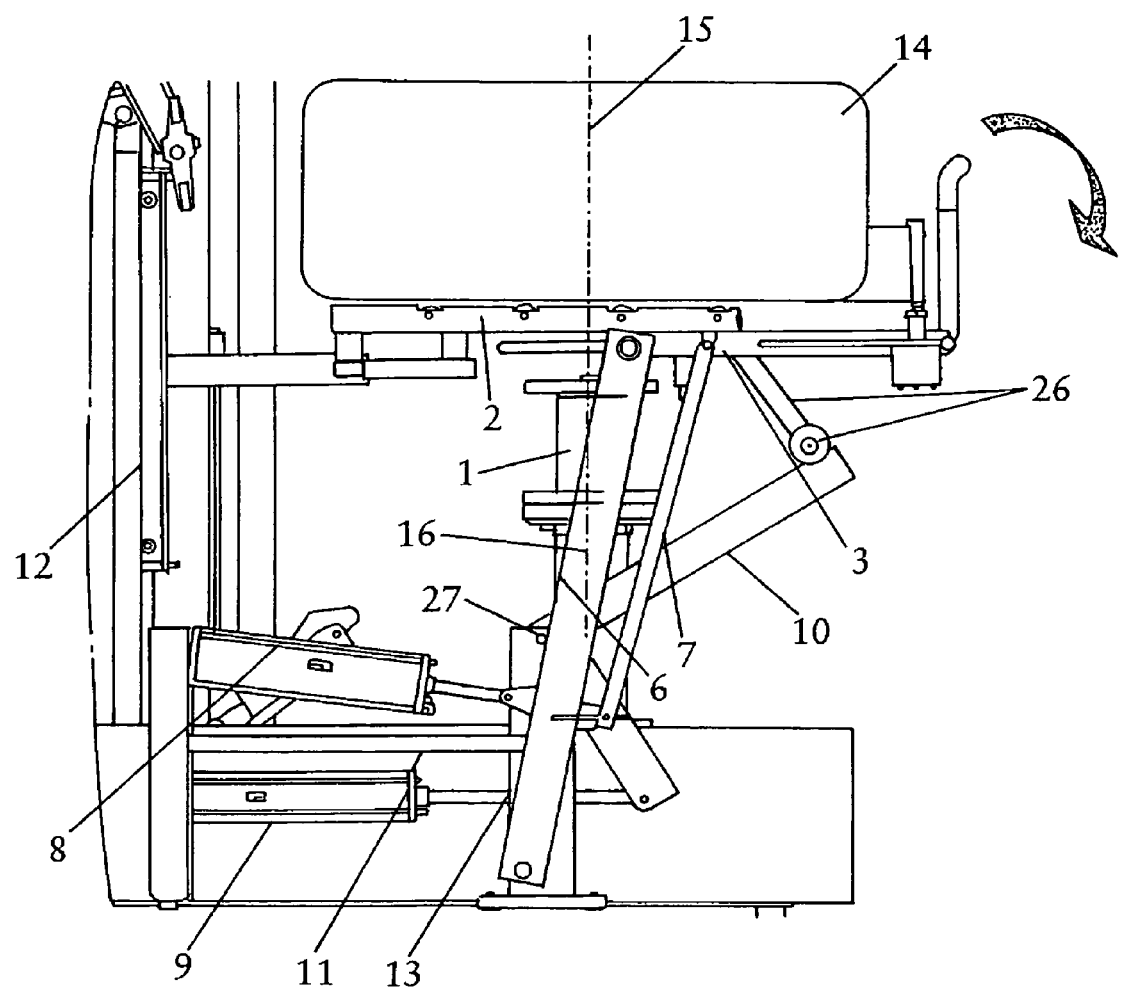
FIG. 5 is a side view of the embodiment, wherein the supporting frame is brought to its end position above the upper position of the front frame and the wheel axis is aligned with the rotation axis of the wheel holder unit.
Figure 6:
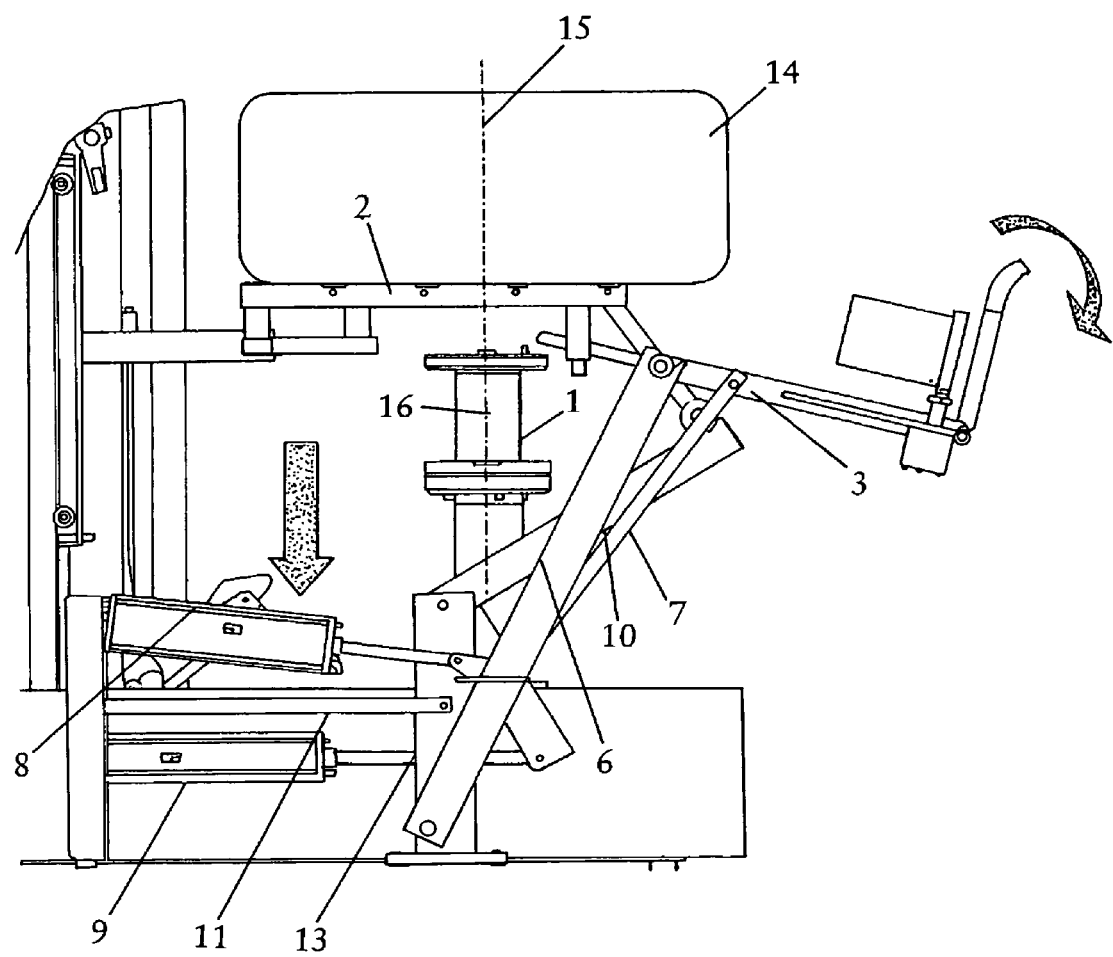
FIG. 6 is a side view of the embodiment, wherein the front frame is brought back to its lower position and the wheel axis and the rotation axis are kept in alignment.

When the actuator 9 reaches the end of stroke (FIG. 5), the supporting frame 2 is higher than the frame 3, therefore substituting the latter as the support for the tyred wheel 14. During this step the wheel 14 rests on a top delimiting surface 20 of the frame 2 and is already axially centered relative to the rotary wheel holder unit 1 below, as shown in FIG. 5. At this point the frame 3 returns to its lower position (FIG. 6). Said action takes place with the direct intervention of the operator, or automatically by the application of frame 2 or 3 under the control of position sensors of the sensing means 22 or 29 and a control unit 17. Wheel axis 15 and rotational axis 16 of the wheel holder unit 1 are mutually aligned. The alignment of the wheel axis 15 with the axis 16 of the wheel holder 1 can be achieved or facilitated by the controlled movement of the wheel holder onto which the wheel should be placed as well.

Figure 7:
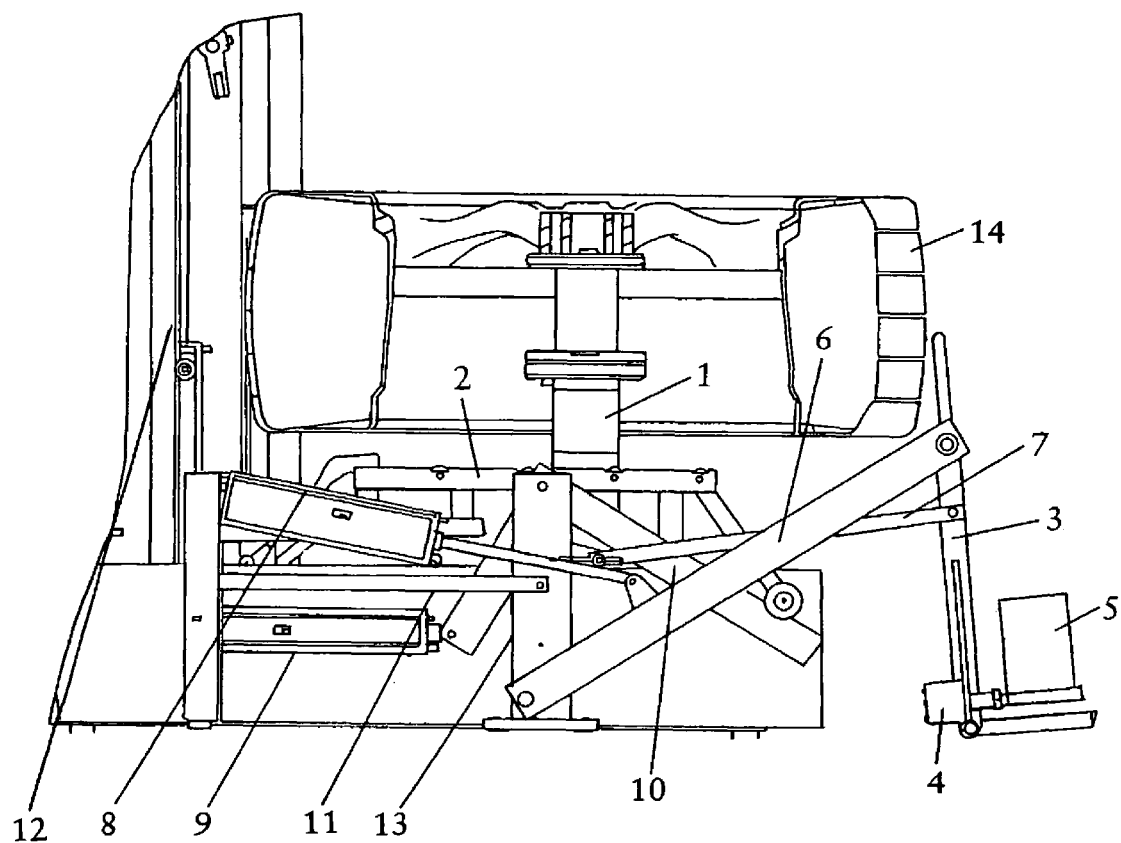
FIG. 7 is a side view of the embodiment, wherein the tyred wheel is positioned on the rotary wheel holder unit and the front frame is placed in the lower position close to the floor surface.

The frame 2 then descends to the lower position, leaving the wheel 14 on the rotary wheel holder unit 1. The descent takes place according to a time sequence set directly by the operator, or using position detectors or sensors for frame 2 (FIG. 7). Sliding means 24 which are designed as rollers are provided in the top delimiting surface 20 of the frame 2.

Figure 3:
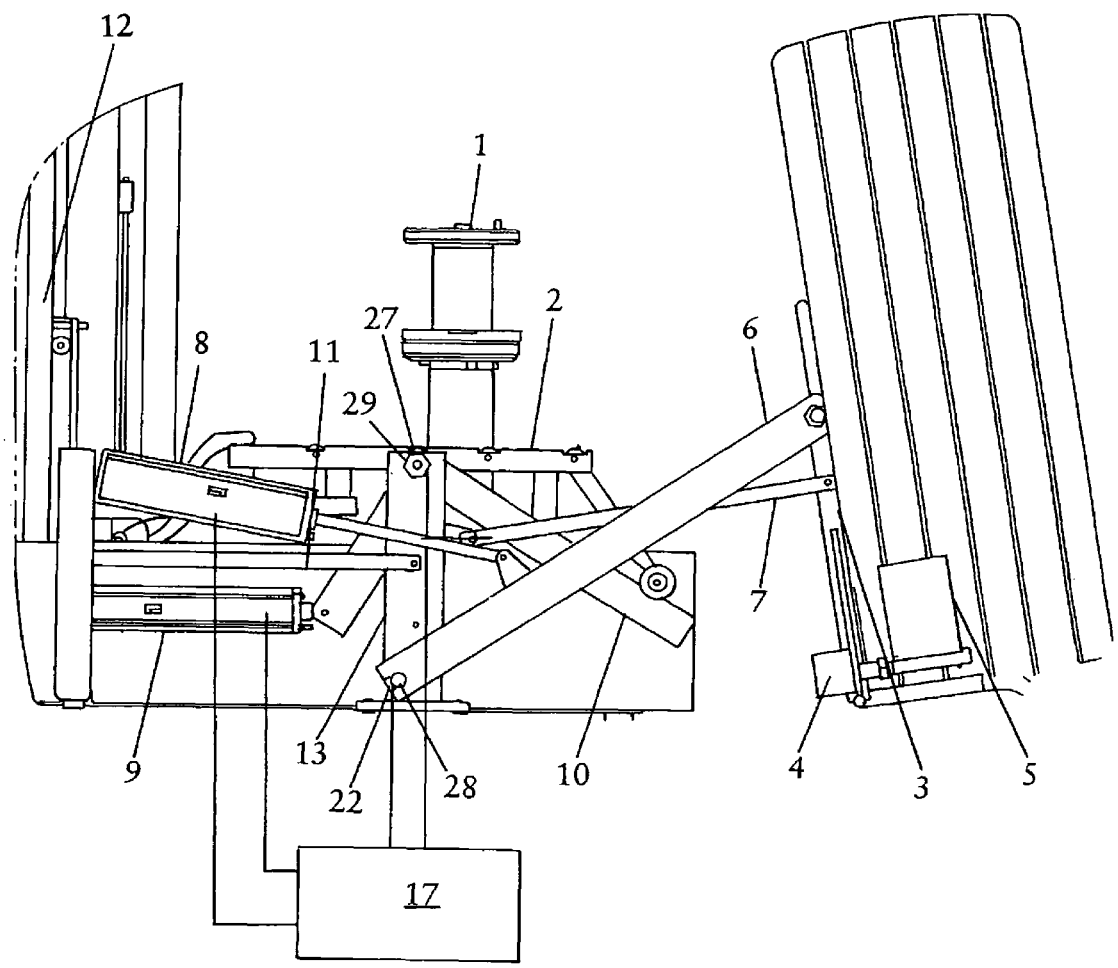
FIG. 3 is a side view of the embodiment, wherein the front frame is in its lower position.
Figure 8:
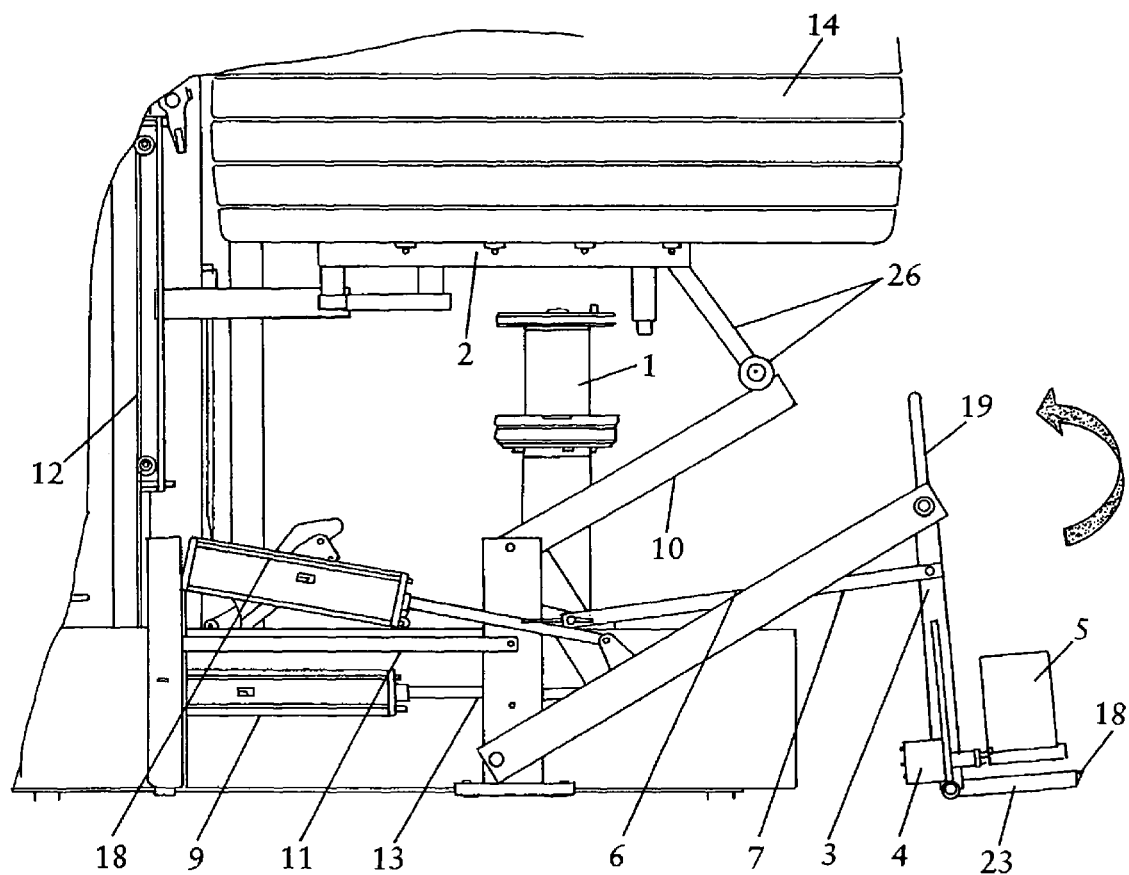
FIG. 8 is a side view of the embodiment, wherein the tyred wheel is lifted from the wheel holder and rests on the supporting frame and the front frame is moved to its upper position.
Figure 9:
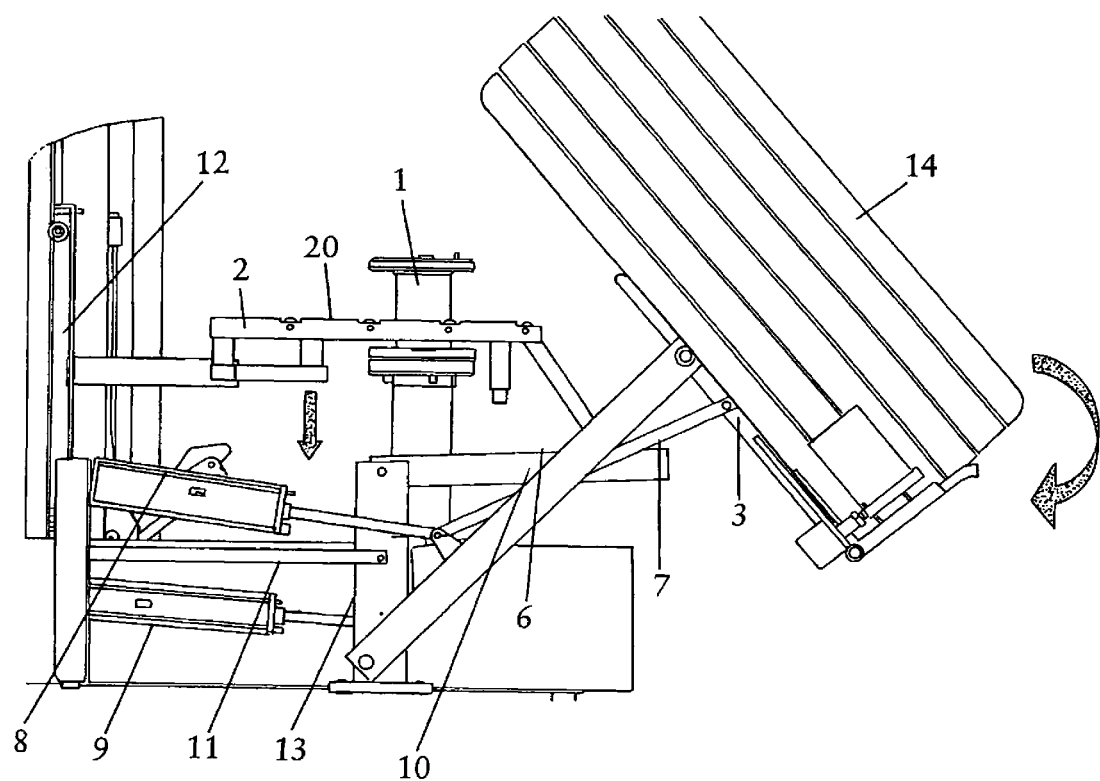
FIG. 9 is a side view of the embodiment, wherein the tyred wheel has been transferred from the supporting frame to the front frame which moves to its lower position close to the floor surface.

For the unloading of the tyred wheel 14 an unload wheel button may be pressed and the actuator 9 is operated for lifting the frame 2, which takes the tyred wheel 14 off the rotary wheel holder unit 1 and moves to the upper end of stroke position (FIG. 8). Then, with the direct intervention of the operator, or automatically with position sensors placed on the stroke of the frame 2, the actuator 8 is operated and the frame 3 is lifted, moving to its upper position (FIG. 8). With the direct intervention of the operator, or automatically with position sensors placed on the stroke of the frame 3, the frame 2 is lowered, leaving the wheel 14 resting on the frame 3. The frames 2 and 3 return (FIG. 9) to their home conditions as illustrated in FIG. 3.

To control the movement of the front frame 3, the control unit 17 may be connected to the detector 4 of the measuring device to receive electrical measuring signals which are proportional to the diameter of the wheel 14. The control unit 17 may be connected additionally to the sensing means 22 which detects the position of the four-bar linkage and thus the positions of the frame 3 and the thereon resting wheel 14. In dependence of the signals received from the sensing means 22 and the detector 4 the operation of the actuator 8 is controlled, particularly in order to achieve an exact alignment of the wheel axis 15 with the rotation axis 16 of the wheel holder unit 1.

The wheel holder itself, particularly the shaft onto which the wheel 14 should be placed in the wheel holder unit 1 can be moved especially under the control of the control unit 17 perpendicularly with respect to the rotation axis 16 to facilitate the alignment of the wheel axis 15 with the rotation axis 16 or to bring the rotation axis 16 into alignment with the wheel axis 15.

The sensing means 22 may include sensors which are placed on the pivotal bearings of the connecting rod 6 to measure the angular positions of the four-bar linkage. An alternative of the sensing means may sense the stroke of the actuator 8 which can be designed as a hydraulic or pneumatic actuator, essentially consisting of a cylinder and movable piston therein. The connecting rods 6 and 7 of the four-bar linkage are connected with one ends to the pivoted bearings on the stationary support 13 and with the other ends to the frame 3. The actuator 8 is connected with at least one of the connecting rods 6, 7.

The frame 3 comprises two frame shoulders 18 and 19 which are arranged perpendicular to one another. During the operation, the wheel 14 rests on said frame shoulders 18 and 19.

The actuator 9 may be designed in the same manner as the actuator 8. Sensing means, for example the sensing means 29 which are connected with the control unit 17 can be used to detect the position of the frame 2 and the control unit 17 can control the movement of the frame 2.

REFERENCE LIST 1 wheel holder unit
2 frame
3 frame
4 detector
5 sensing element
6 connecting rod
7 connecting rod
8 actuator means
9 actuator
10 lifting unit
11 stabilizing rod
12 guidance device
13 support
14 tyred wheel
15 wheel axis
16 rotation axis
17 control unit
18 frame shoulder
19 frame shoulder
20 top delimiting surface
21 support frame
22 sensing means
23 fixing points
24 sliding means (rollers)
25 fixed axis
26 roller guide
27, 28 pivot points
29 sensing means

The invention claimed is:

1. Apparatus for positioning a tyred wheel onto an upright rotary wheel holder unit of a tyre changer machine, comprising:
  a first frame for supporting the wheel and adapted to move the wheel between a first lower position and an upper position above the rotary wheel holder unit where the wheel is aligned with a rotation axis of the rotary wheel holder unit, and from which the wheel can be lowered onto the rotary wheel holder unit,
  first actuator means for driving the first frame between the first lower position and the upper position,
  a second frame adapted to move between a second lower position through the upper position to an end position above said upper position, and
  second actuator means for driving the second frame between the second lower position and the end position;
  wherein the second frame is adapted to remove the wheel from the first frame when the first frame is in the upper position, by movement of the second frame from said upper position to said end position; is adapted to support the wheel with the wheel axis in alignment with the rotation axis of the rotary wheel holder unit and is adapted to be lowered by the action of the second actuator means for positioning the tyred wheel onto the rotary wheel holder unit.

2. The apparatus according to claim 1, characterized in that a measuring device for measuring the diameter of the tyred wheel is connected with a control unit to operate the first actuator means responsive to the measured diameter value to position the tyred wheel in the upper position such that the wheel axis is in close alignment with the rotation axis of the wheel holder unit.

3. The apparatus according to claim 1 or 2 characterized in that the second actuator means are adapted to be operated during the movement of the first frame to said upper position.

4. The apparatus according to claim 1 or 2, characterized in that the second frame is guided vertically in a guidance device.

5. The apparatus according to claim 1 or 2, characterized in that the first frame is connected to a linkage means for guiding the wheel along a combined motion path of rotation and translation between the lower position and the upper position.

6. The apparatus according to claim 5, characterized in that said linkage means comprises a four-bar linkage mechanism.

7. The apparatus according to claim 1 or 2, characterized in that the first frame and the second frame are configured to be actuated independently from each other by the actuator means.

8. The apparatus according to claim 1 or 2, characterized in that the first frame comprises two frame shoulders perpendicular to one another.

9. The apparatus according to claim 1 or 2, characterized in that the second frame has a top delimiting surface on which the tyred wheel can rest and/or slide.

10. The apparatus according to claim 9, characterized in that the second frame includes a supporting frame extending at least partly around the rotary wheel holder unit and is provided with said top delimiting surface.

11. The apparatus according to claim 1 or 2, characterized in that sensing means are provided and configured to sense the position of the first frame.

12. The apparatus according to claim 2, characterized in that the control unit is connected to said sensing means to control the movement of the first frame to bring the wheel axis into alignment with the rotation axis of the wheel holder unit.

13. The apparatus according to claim 2 or 12, characterized in that the control unit is adapted to control the movement of the first frame and/or of the wheel holder itself, particularly the shaft of the wheel holder unit in dependence of the diameter of the tyred wheel, particularly to align the wheel axis with the rotation axis of the wheel holder unit.

14. The apparatus according to claim 2, characterized in that said measuring device for measuring the diameter of the tyred wheel includes a sensing element adapted to sense the circumferential surface of the tyred wheel in relation to two fixing points on which the outer surface of the tyred wheel is fixed against rotation or movement on the first frame and a detector detecting the position of the sensing element.

15. The apparatus according to claim 2 or 14, characterized in that the measuring device for measuring the diameter of the tyred wheel is provided on the first frame.

16. The apparatus according to claim 14, characterized in that the sensing element of said measuring device is a mechanical sensing element pivoted around a fixed axis on the first frame, wherein the detector detects the angular position of the mechanical sensing element.

17. The apparatus according to claim 14 or 16, characterized in that the two fixing points are linear frame elements which are arranged parallel to the axis around which the mechanical sensing element is pivoted on the first frame.

18. The apparatus according to claim 14 or 16, characterized in that the two fixing points are positioned close to the floor surface when the first frame is brought to its low position.

19. The apparatus according to any one of claims 2, 12, 14, and 16, characterized in that the frames support sliding means for transferring the wheel or the rim between the two frames.

20. The apparatus according to claim 19, characterized in that the sliding means comprise rollers.

21. The apparatus according to claim 20, characterized in that the rollers are configured to be motordriven.

\* \* \* \* \*